(12) United States Patent
Matteson

(10) Patent No.: US 10,445,341 B2
(45) Date of Patent: Oct. 15, 2019

(54) METHODS AND SYSTEMS FOR ANALYZING DATASETS

(71) Applicant: The MathWorks, Inc., Natick, MA (US)

(72) Inventor: Andrew Matteson, Cambridge, MA (US)

(73) Assignee: The MathWorks, Inc., Natick, MA (US)

( * ) Notice: Subject to any disclaimer, the term of this patent is extended or adjusted under 35 U.S.C. 154(b) by 856 days.

(21) Appl. No.: 14/300,123

(22) Filed: Jun. 9, 2014

(65) Prior Publication Data

US 2015/0356163 A1 Dec. 10, 2015

(51) Int. Cl.
*G06F 16/28* (2019.01)

(52) U.S. Cl.
CPC .................. *G06F 16/285* (2019.01)

(58) Field of Classification Search
CPC .......... G06F 17/30598; G06F 16/285
USPC ............................................. 707/737
See application file for complete search history.

(56) References Cited

U.S. PATENT DOCUMENTS

| | | | | |
|---|---|---|---|---|
| 6,307,965 B1* | 10/2001 | Aggarwal | ......... | G06F 17/30598 382/225 |
| 8,352,465 B1* | 1/2013 | Jing | ................. | G06F 17/30867 707/723 |
| 2003/0175720 A1* | 9/2003 | Bozinov | ............. | C12Q 1/6837 506/9 |
| 2005/0075846 A1* | 4/2005 | Kim | ....................... | G01H 9/004 703/1 |
| 2005/0075962 A1* | 4/2005 | Dunne | .................. | G06Q 40/00 705/36 R |
| 2005/0114382 A1* | 5/2005 | Lakshminarayan | ........................ | G06K 9/6218 |
| 2006/0064287 A1* | 3/2006 | Standingford | .......... | G06F 17/50 703/2 |
| 2012/0254179 A1* | 10/2012 | Cao | ........................ | G06Q 30/02 707/737 |
| 2016/0004839 A1* | 1/2016 | Forest | .................... | G09B 23/30 703/2 |

OTHER PUBLICATIONS

Park et al., A simple and fast algorithm for K-medoids clustering, Expert Systems with Applications 36 (2009), pp. 3336-3341.*

* cited by examiner

*Primary Examiner* — Jensen Hu
(74) *Attorney, Agent, or Firm* — Finnegan, Henderson, Farabow, Garrett & Dunner, LLP

(57) ABSTRACT

Computer-implemented methods are provided for analyzing datasets. Consistent with disclosed embodiments, a computing system may be configured to select a cluster from clusters partitioning the dataset. The clusters may include a subset of the dataset, and may be associated with a current medoid of the cluster and a current cost of the cluster. The computing system may determine a new cost of the selected cluster and a new medoid of the selected cluster based on a matrix with rows corresponding to data in a subset of the cluster. The columns may correspond to data in the dataset or only to data in the cluster. The computer system may replace the current medoid of the selected cluster with the new medoid of the selected cluster based on the new cost of the selected cluster. The computer system may output the cluster information to determine a structure of the dataset.

34 Claims, 9 Drawing Sheets

METHODS AND SYSTEMS FOR ANALYZING DATASETS

TECHNICAL FIELD

The disclosed embodiments generally relate to determining the structure of datasets and, more specifically, to rapid and high-accuracy methods of clustering datasets around medoids.

BACKGROUND

Analyzing a dataset may require determining a structure in the data. This structure may depict observations, objects or data in the dataset as similar in some fashion. The analysis may constitute partitioning the dataset into a number of clusters, each cluster including those data in the dataset similar to some datum representative of the cluster. Certain methods of partitioning datasets, such K-means and K-medoids, may attempt to minimize a metric, such as a sum of distances between a datum and a center of the cluster including the datum. The K-means method determines mean values, called centroids, as the centers of the clusters. The K-medoids method determines exemplary members of the clusters, called medoids, as the centers of the clusters.

Methods partitioning datasets around medoids have advantages over methods partitioning datasets around centroids. Methods partitioning datasets around medoids may be more broadly applicable. Such methods may be used when the center of the cluster must fall within the data domain of the dataset. For example, the data in the dataset may be associated with a discrete-valued variable, in which case a mean may be impossible to define. Even defining a median for categorical data taking values such as "red," "blue," or "green" may be difficult. Methods partitioning datasets around medoids may also be more robust in the presence of spurious outlying data.

However, existing methods of partitioning datasets around medoids scale poorly with increasing dataset size and complexity. These methods require significant amounts of memory; the number of required calculations may increase with the square of the number of data in the dataset. Thus methods and systems for analyzing datasets are needed that are robust to outliers, permit clustering of discrete and continuous data, scale efficiently to larger datasets, and execute more quickly and using less memory than existing methods known to one of skill in the art.

SUMMARY

The disclosed embodiments may include, for example, computer-implemented methods for analyzing a dataset. These methods may determine the medoids for a number of clusters of data in the dataset. In determining these medoids, the methods may update clusters and perform online updates of clusters based only on subsets of the data in the clusters. By using only subsets of data, these disclosed methods may dramatically reduce the time and memory cost of clustering around medoids without sacrificing the accuracy of the clustering.

The disclosed embodiments may include, for example, a first computer-implemented method for analyzing a dataset. The method may include selecting a cluster from clusters partitioning the dataset. Each of the clusters may include a subset of the dataset. Each of the clusters may be associated with a current medoid of the cluster and a current cost of the cluster. The method may include determining a new cost of the selected cluster and a new medoid of the selected cluster based on a data-to-cluster matrix. The data-to-cluster matrix may include rows corresponding to data in a subset of the cluster and columns corresponding to data in the cluster. The value of each element of the matrix may be a cost. This cost may be based on a distance between the datum corresponding to the row of the element and the datum corresponding to the column of the element. The method may include replacing the current medoid of the selected cluster with the new medoid of the selected cluster if the new cost of the selected cluster is less than the current cost of the selected cluster. The method may include outputting cluster information to determine a structure of the dataset. In certain embodiments, the subset of the cluster may be determined randomly. In other embodiments, the distance may depend on a first and second value of a discrete variable and a first and second value of a continuous variable.

The disclosed embodiments may also include, for example, a second computer-implemented method for analyzing a dataset. This method may include selecting a cluster from clusters partitioning the dataset, where each cluster may include a subset of the dataset, and may be associated with a current medoid of the cluster. The method may include determining a new total cost of the partition based on a data-to-dataset matrix with rows corresponding to data in a subset of the selected cluster, columns corresponding to data in the dataset, and a cost for each element of the data-to-dataset matrix. The cost may be based on a distance between the datum corresponding to the row of the element and the datum corresponding to the column of the element. The method may replace the current medoid of the selected cluster with the new medoid of the selected cluster if the new total cost of the partition is less than a current total cost of the partition. The method may output cluster information to determine a structure of the dataset. In some embodiments, the subset of the selected cluster may be selected deterministically. In certain aspects, the subset of the selected cluster may include a first number of data closest to a first medoid and a second number of data furthest from the first medoid. In other embodiments, the new total cost of the partition may also depend on a cluster-to-dataset matrix with rows corresponding to clusters and columns corresponding to data in the dataset.

The disclosed embodiments may also include, for example, a third method for analyzing a dataset. The method may include selecting a first cluster from clusters partitioning the dataset, where each cluster may include a subset of the dataset and may be associated with a current medoid of the cluster and a current cost of the cluster. The method may include determining a new medoid of the first cluster and a new cost of the first cluster based on a data-to-cluster matrix. The data-to-cluster matrix may include rows corresponding to data in a subset of the first cluster and columns corresponding to data in the first cluster. The method may include replacing the current medoid of the first cluster with the new medoid of the first cluster if the new cost of the first cluster is less than the current cost of the first cluster. The method may include selecting a second cluster from the clusters partitioning the dataset. The method may include determining a new medoid of the second cluster and a new total cost of the partition based on a data-to-dataset matrix with rows corresponding to data in a subset of the second cluster and columns corresponding to data in the dataset. The method may include replacing the current medoid of the second cluster with the new medoid of the second cluster if the new total cost of the partition is less than a current total cost of the partition. The method may include outputting cluster information to determine a structure of the dataset. In some embodiments, the subset of the first cluster may be determined randomly. In various embodiments, the subset of the second cluster may be selected deterministically. In certain aspects, the subset of the selected cluster may include a first number of data closest to a first medoid and a second number of data furthest from the first medoid.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Figure 1:
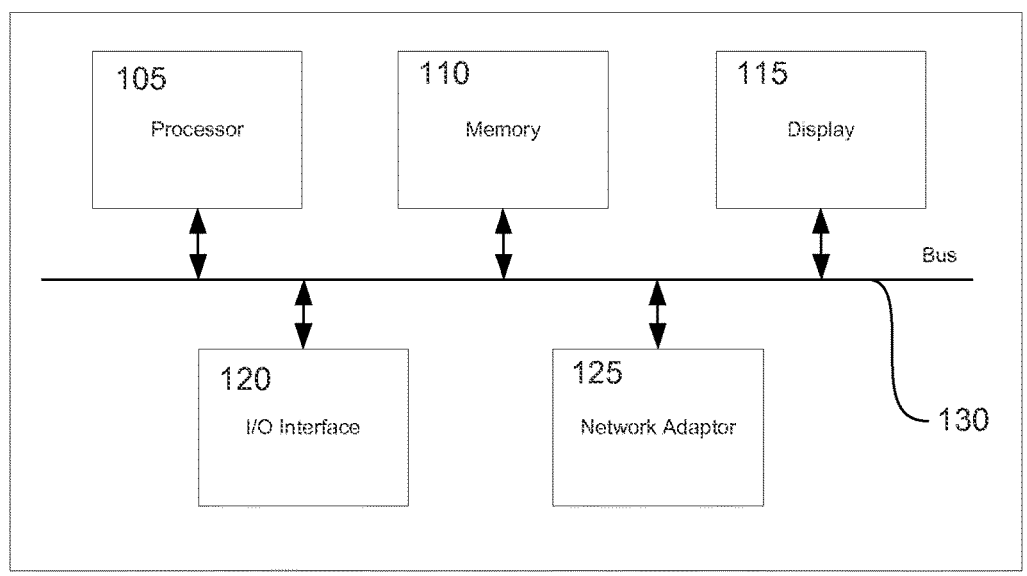
FIG. 1 depicts a block diagram of an exemplary computing system.

In various embodiments, the disclosed methods or systems are implemented via one or more computing devices. FIG. 1 illustrates a block diagram of an exemplary computing system 100 according to some embodiments. According to some embodiments, system 100 includes a processor 105, memory 110, display 115, I/O interface(s) 120, and network adapter 125. These units may communicate with each other via bus 130, or wirelessly. The components shown in FIG. 1 may reside in a single device or multiple devices.

In various embodiments, processor 105 may be a microprocessor or a central processor unit (CPU) performing various methods in accordance to the embodiment. Memory 110 may include a computer hard disk, a random access memory (RAM), a removable storage, or a remote computer storage. In various embodiments, memory 110 stores various software programs executed by processor 105. Display 115 may be any device which provides a visual output, for example, a computer monitor, an LCD screen, etc. I/O interfaces 120 may include keyboard, a mouse, an audio input device, a touch screen, or an infrared input interface. Network adapter 125 enables device 100 to exchange information with external networks. In various embodiments, network adapter 125 includes a wireless wide area network (WWAN) adapter, or a local area network (LAN) adapter.

Figure 2:
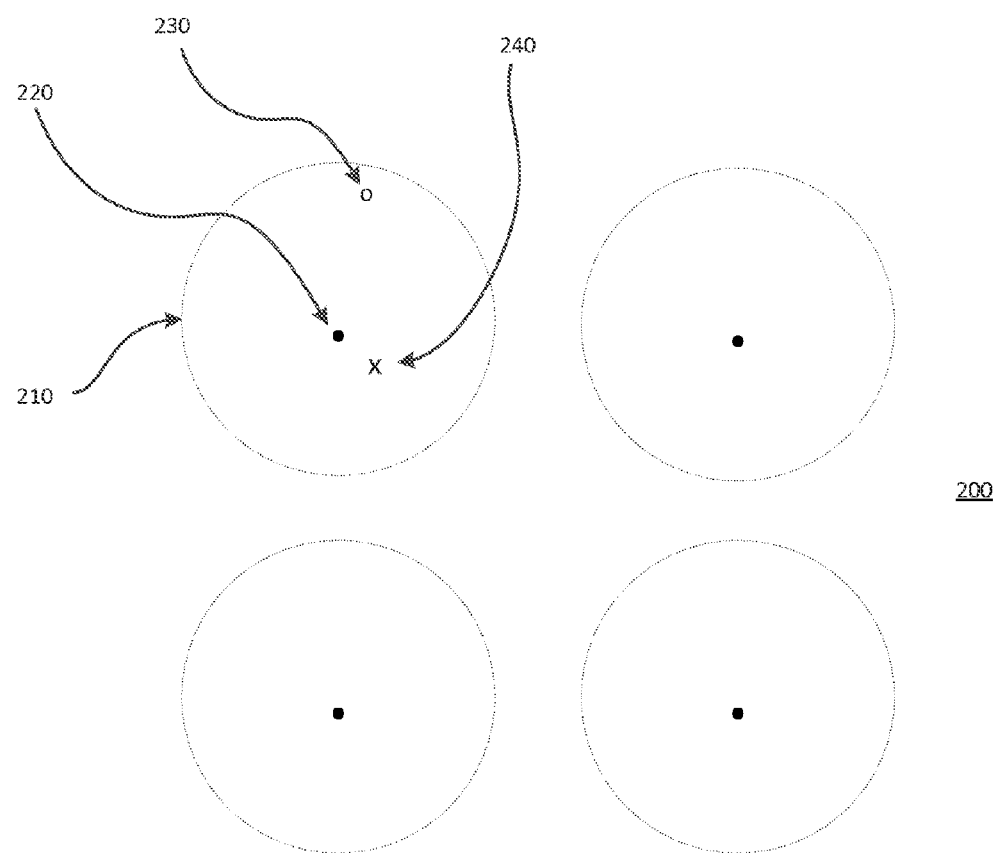
FIG. 2 depicts partitioning an exemplary dataset.

FIG. 2 depicts partitioning an exemplary dataset 200 consistent with disclosed embodiments. Dataset 200 may comprise data, such as datum 220, 230, and 240. These data may be associated with a plurality of variables, consistent with disclosed embodiments. These variables may be continuous variables, such as measurements or real numbers, or may be discrete variables, such as categories or counting numbers. The data in dataset 200 may be associated with values for these variables. For example, data in dataset 200 may be associated with values for both a continuous variable, such as a measurement, and a discrete variable, such as a day of the week or a color.

Computing system 100 may be configured to partition the dataset 200 according to a cost function into a number of clusters of data, such as cluster 210. In certain aspects, a dataset of any size may be partitioned into clusters. But the improvement over current techniques known to one of ordinary skill in the art may increase with increasing dataset size.

Partitioning dataset 200 may comprise assigning data in dataset 200 to clusters consistent with disclosed embodiments. Every datum in dataset 200 may be assigned to a cluster. No datum of dataset 200 may be assigned to more than one cluster in some embodiments. Computer system 100 may be configured to assign data to clusters according to a metric in some embodiments. The metric may be, for example, a distance metric. The distance may be between a datum and a representative datum of the cluster. The clusters, such as cluster 210, may have medoids, such as medoid 220. The representative datum may be the medoid of a cluster. Remaining data in a cluster may be close to the medoid or far from the medoid according to some metric. According to some metric, a datum may be the closest datum in a cluster to the medoid, such as datum 230, or the furthest datum in a cluster from the medoid, such as datum 240. In some embodiments the number of clusters may be provided. For example, computer system 100 may receive the number of clusters through I/O interface 120. This number of clusters may be provided by a user of exemplary computing system 100, or a third party. In other aspects, the number of clusters may be received through network adaptor 125. For example, the number of clusters may be received from another computing system in certain aspect. A default number of clusters may be provided consistent with disclosed embodiments.

The partition of dataset 200 may minimize a cost function according to disclosed embodiments. Computing system 100 may be configured to evaluate multiple partitions of dataset 200 and determine the partition having the lowest cost. Computing system 100 may be configured to provide the partition found to have lowest value of the cost function. In some embodiments, computer system 100 may be configured to determine a structure of the large dataset based on this partition. As described herein, minimizing a metric or cost function refers generally to determining extreme values of the metric or cost function, such as maxima or minima of the metric or cost function, as would be recognized by one of skill in the art.

The cost function may depend on a cost associated with each cluster consistent with disclosed embodiments. The cost associated with each cluster may depend on data in the cluster. The cost associated with each cluster may depend on the medoid of the cluster. For example, the value of a metric based on the medoid and another datum in the cluster may contribute to the cost of the cluster. As an additional example, the cost of the cluster may depend on the value of the metric for every combination of the medoid and another datum in the cluster. In certain aspects, the cost of the cluster may be based on the sum of the distances between the medoid and the other data in the cluster. The medoid may be the datum in the cluster that minimizes the cost function for the cluster consistent with disclosed embodiments.

The metric may be a distance metric, consistent with disclosed embodiments. As a non-limiting example, the metric may be a function of the Euclidean distance, such as a squared Euclidean distance; a standardized Euclidean distance, for example a distance taking scaled variable values as inputs; a Manhattan distance; a Minkowski distance; a Chebychev distance; a Mahalanobis distance; a cosine distance calculated as one minus the cosine of the included angle between data in dataset 200; a correlation distance calculated as one minus the sample correlation between data in dataset 200; a Spearman distance calculated as one minus the sample's Spearman's rank correlation between data in dataset 200; a hamming distance; a jaccard distance calculated as one minus the Jaccard coefficient; a distance metric based on a measure of mutual information; or similar distance metrics known to one of skill in the art. The metric may be a heterogeneous distance metric dependent on at least one discrete-valued and at least one continuous-valued variable. In some cases, the metric may be an arbitrary metric. An arbitrary metric may be defined by the user or a by third party in some embodiments. Consistent with disclosed embodiments, the metric may be received by the computer system through I/O interface 120 or network adaptor 125.

Figure 3:
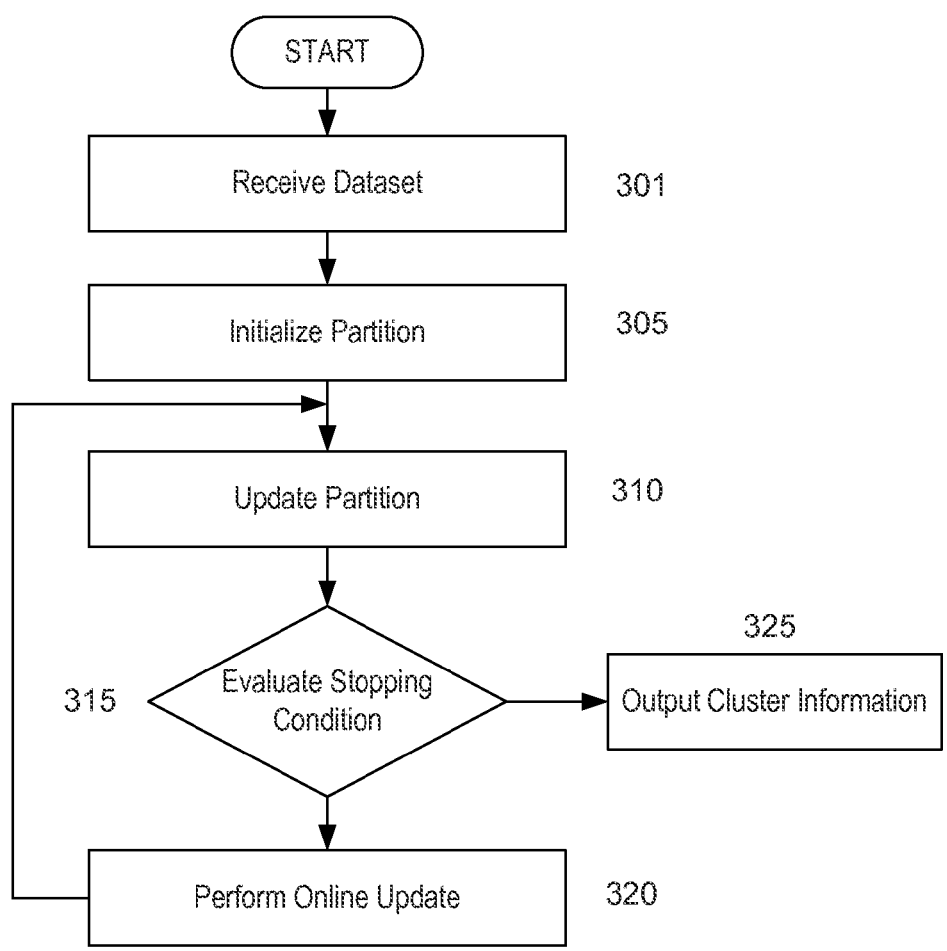
FIG. 3 depicts a flowchart of an exemplary method for analyzing a dataset.

FIG. 3 depicts a flowchart of an exemplary method for analyzing a dataset consistent with disclosed embodiments. Computing system 200 may receive dataset 200 in step 301 consistent with disclosed embodiments. Dataset 200 may be received, for example, through I/O interface 120 or network adaptor 125. Dataset 200 may be retrieved from memory 110 or provided by a user of computing system 100. Dataset 200 may be associated with an initial partition in some embodiments. Computer system 100 may receive initial partition information consistent with disclosed embodiments. Initial partition information may be received, for example, through I/O interface 120 or via network adaptor 125. Initial partition information may also be retrieved, for example, from memory 110 or provided by a user of computing system 100. In some embodiments, initial partition information may include initial medoids or cluster assignments. In some cases, initial partition information may include references to data in dataset 200 or data structures representing clusters.

Computing system 100 may be configured to determine an initial partition of dataset 200 in step 305 consistent with disclosed embodiments. Computer system 100 may automatically calculate the initial partition of dataset 200 in certain aspects. For example, computer system 100 may be configured to select initial medoids from dataset 200 using K-medoids methods such as the method described in H. S. Park and C. H. Jun, "A simple and fast algorithm for K-medoids clustering," *Expert Systems with Applications*, 36, (2) (2009), 3336-3341, or similar clustering methods known to one of skill in the art. Computing system 100 may be configured to apply such clustering methods to a random sample of data from dataset 200 to select initial medoids. As another example, computer system 100 may be configured to randomly select initial medoids from dataset 200.

Computing system 100 may be configured to update the partition in step 310 consistent with disclosed embodiments. Computing system 100 may be configured to update the partition by updating the medoids for one or more clusters partitioning dataset 200. In some embodiments, computing system 100 may be configured to repartition dataset 200 based on the updated medoids. Computing system 100 may be configured to update the partition until the disclosed embodiments have converged on a partition. In some embodiments, computing system 100 may be configured to determine convergence based on the state of the disclosed embodiments, such as a value of a counter, an absolute or relative value of a cost function, a rate of change of a cost function, a number of clusters updated, a number of repartitions of dataset 200, an elapsed time, a number of cluster updates meeting a predefined criteria, or other criteria known to one of skill in the art.

Computing system 100 may be configured to evaluate a stopping condition in step 315. The evaluation may be based on the state of the disclosed embodiments, such as a value of a counter, an absolute or relative value of a cost function, a rate of change of a cost function, a number of clusters updated, a number of repartitions of dataset 200, an elapsed time, a number of cluster updates meeting a predefined criteria, or other criteria known to one of skill in the art. In some embodiments, stopping condition 450 may be chosen to balance required accuracy against execution speed of the disclosed systems and methods. Satisfying the stopping condition may indicate that an estimated accuracy has been achieved. In at least one embodiment, step 315 may be performed after step 310. In some embodiments, step 315 may be performed after step 320. In certain embodiments, step 315 may be performed before and after step 320. Step 315 may also be combined with another step of the disclosed embodiments, such as step 310 or 320.

Computing system 100 may be configured to perform an online update of the partition in step 320 consistent with disclosed embodiments. In some embodiments, performing the online update may cause the disclosed embodiments to escape an equilibrium state corresponding to a local minimum of the cost function, such that the cost function continues to improve with further iterations of the disclosed embodiments. In certain aspects, performing the online update may include updating the medoids for selected clusters and repartitioning dataset 200. Computing system 100 may be configured to reparation dataset 200 after performing an online update of one or more of the clusters partitioning dataset 200 in step 320. In some embodiments, computing system 100 may be configured resume updating the partition (step 310) after performing the online update step. In other embodiments, computing system 100 may be configured output cluster information (step 325) after repartitioning dataset 200.

Computing system 100 may be configured to output cluster information in step 325 consistent with disclosed embodiments. Cluster information may include, for example, an indication of cluster membership for each datum of dataset 200, an indication of the medoid location for one or more clusters of the partition, and/or cost information, such as the cost associated with the partition, the cost associated with one or more clusters of the partition, or the cost associated with data in dataset 200. Cluster information may include references to one or more medoids. For example, cluster information may include the indices of one or more medoids in dataset 200.

Figure 4:
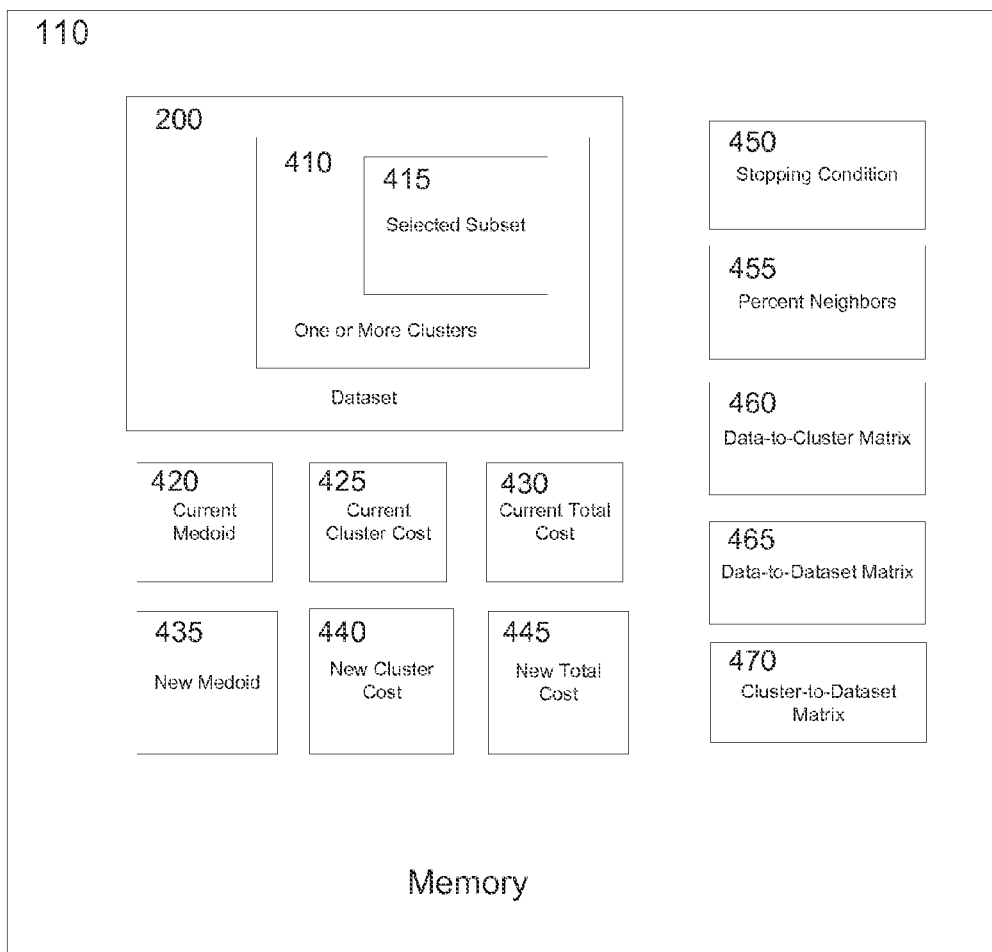
FIG. 4 depicts a block diagram of an exemplary memory component.

FIG. 4 depicts a block diagram of an exemplary memory component consistent with disclosed embodiments. In some embodiments, computing system 100 may be configured to store dataset 200 as a data structure in memory 110. Dataset 200 may include a subset of data associated with one or more selected clusters 410. Selected clusters 410 may include a selected subset 415 of data associated with one of the selected clusters. Computing system 100 may be configured to store in memory 110 a data structure including the current medoid 420 in some embodiments. Current medoid 420 may be the medoid associated with a cluster partitioning dataset 200 prior to updating the cluster in certain aspects. Computing system 100 may be configured to store in memory 110 a data structure including the current cluster cost 425 in some embodiments. Current cluster cost 425 may be the cost associated with a cluster partitioning dataset 200 prior to updating the cluster in certain aspects. Computing system 100 may be configured to store in memory 110 a data structure including the current total cost 430 in some embodiments. Current total cost 430 may be the cost associated with a partition of dataset 200 prior to updating one or more clusters of the partition in certain aspects. Computing system 100 may be configured to store in memory 110 a data structure including the new medoid 435 in some embodiments. New medoid 435 may be the medoid associated with a cluster and obtained by updating the cluster in certain aspects. Computing system 100 may be configured to store in memory 110 a data structure including the new cluster cost 440 in some embodiments. New cluster cost 440 may be the cost associated with a cluster after updating the cluster in certain aspects. Computing system 100 may be configured to store in memory 110 a data structure including the new total cost 445 in some embodiments. New total cost 445 may be the cost associated with a partition of dataset 200 after updating the cluster in certain aspects.

Computing system 100 may be configured to store in memory 110 a data structure including a stopping condition 450 consistent with disclosed embodiments. In some embodiments, stopping condition 450 may include a threshold and a counter. In at least one embodiment, computing system 100 may be configured with a default value for the threshold, or may derive a default value for the threshold. In some embodiments, computing system 100 may be configured to receive a value of the threshold, or derive a value of the threshold from a value received. The received value may be received through I/O interface 120 in certain aspects. The received value may be received through network adaptor 125 in various aspects. The received value may be provided by the user, or provided by another computing system in some aspects. The received value may be received, for example, from another program on computing system 100. In certain embodiments, stopping condition 450 may comprise a logical test including instructions stored in memory 110 that when executed by processor 105 cause computing system 100 to perform certain operations consistent with disclosed embodiments. In some embodiments, the value of stopping condition 450 may determine a trade-off between accuracy and processing time. Larger values of the threshold may cause the disclosed methods and systems to continue seeking better medoids despite repeated unsuccessful attempts to update clusters.

Computing system 100 may be configured to store in memory 110 a data structure including a value for percent neighbors 455 consistent with disclosed embodiments. In certain embodiments, computer system 100 may be configured to update a cluster based on selected data in the cluster. In such aspects, the number of selected data may depend on percent neighbors 455. In some embodiments, the value of percent neighbors 455 may range from zero to one. Preferably, the value of percent neighbors 455 may range from 0.0001 to 0.1. More preferably, the value of percent neighbors 455 may range from 0.001 to 0.01. Computing system 100 may be configured to use a default value of percent neighbors 455 in certain aspects. Computing system 100 may be configured to receive the value of percent neighbors 455 in various aspects. The value of percent neighbors 455 may be received, for example, through I/O interface 120 or network adaptor 125. The value of percent neighbors 455 may also be provided by the user, or provided by another computing system. In certain embodiments, the value of percent neighbors 455 may be received from another program on computing system 100.

As described in greater detail with reference to FIG. 5, computing system 100 may be configured to store in memory 110 a data structure including a data-to-cluster matrix 460. Computing system 100 may be configured to create a data-to-cluster matrix 460 using processor 105 when updating the partition in step 310. Computing system 100 may be configured to evaluate data-to-cluster matrix 460 using processor 105 to determine new medoid 435 and new cluster cost 440 in certain embodiments.

As described in greater detail with reference to FIG. 6A, computing system 100 may be configured to store in memory 110 a data structure including a data-to-dataset matrix 465. In certain aspects, computing system 100 may be configured to create a data-to-dataset matrix 465 using processor 105 when performing an online update in step 320. Computing system 100 may be configured to evaluate data-to-dataset matrix 465 using processor 105 to determine new medoid 435. As described in greater detail with reference to FIG. 6B, computing system 100 may be configured to store in memory 110 a data structure including a cluster-to-dataset matrix 470. In certain aspects, computing system 100 may be configured to create a cluster-to-dataset matrix 470 using processor 105 when performing an online update in step 320. Computing system 100 may be configured to evaluate cluster-to-dataset matrix 465 using processor 105 to determine new total partition cost 445.

The composition of memory 110 as presented in this embodiment is not the only potential embodiment and not intended to be limiting. Envisioned embodiments may not require every disclosed element of memory 110. In certain embodiments, elements of memory 110 may be combined, divided, modified, or absent. Additionally, elements of memory 110 may be stored in one or more physical memories, or represented through a variety of data structures consistent with disclosed embodiments.

Figure 5:
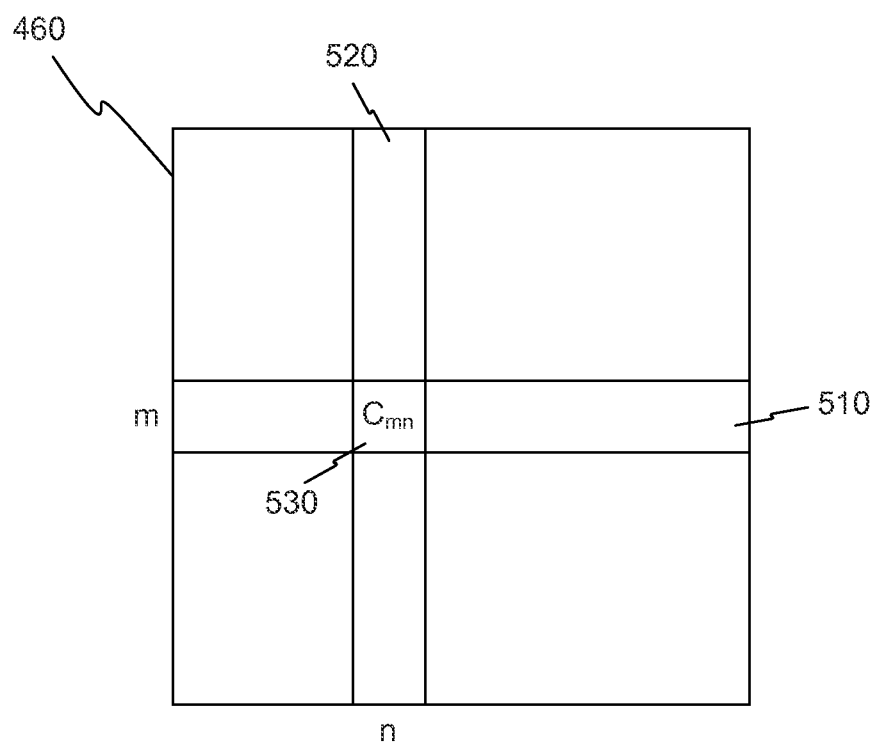
FIG. 5 depicts an exemplary data-to-cluster matrix.

FIG. 5 depicts an exemplary data-to-cluster matrix 460 consistent with disclosed embodiments. As described above with respect to FIG. 4, computing system 100 may be configured to store in memory 110 a data structure for updating a cluster. In some embodiments, computing system 100 may be configured to store data-to-cluster matrix 460. Data-to-cluster matrix 460 may include rows 510 corresponding to the data in the cluster in some embodiments. Data-to-cluster matrix 460 may include columns 520 corresponding to data in the cluster in some embodiments. The elements of the data-to-column matrix may be, for example, costs 530.

Computing system 100 may be configured to select the data in the cluster corresponding to the rows of the data-to-cluster matrix 460 consistent with disclosed embodiments. Computing system 100 may be configured to randomly sample the data in the cluster corresponding to the rows of the data-to-cluster matrix 460. The number of rows in the data-to-cluster matrix 460 may be a function of the number of data in the cluster, consistent with disclosed embodiments. The number of rows may be less than or equal to the number of data in the cluster. The number of rows may be chosen based on the performance requirements of the user. In certain aspects, reducing the number of rows will increase the speed of the disclosed methods and systems at the expense of the accuracy of the methods and systems. The choice of an appropriate number of rows may also depend on the size and complexity of dataset 200, the performance characteristics of computing system 100, such as the size of memory 110, and the choice of metric used to calculate the cost function. In one embodiment, the number of rows may equal the least integer greater than the product of percent neighbors 455 and the number of data in the cluster. The number of columns in the data-to-cluster 460 matrix may be less than the number of data in the cluster. Computing system 100 may be configured to randomly or deterministically sample the data in the cluster corresponding to the columns of the data-to-cluster matrix 460. Computing system 100 may be configured to use kernel methods to transform the columns of the data-to-cluster matrix 460 into an inherently lower dimensional space in certain aspects. In various aspects, computing system 100 may be configured to cluster data using an approximate distance metric. For example, computing system 100 may be configured to use principal component analysis, or similar methods known to one of skill in the art, to transform these columns while maintaining a good approximation of the space.

Consistent with disclosed embodiments, costs 530 may depend on the datum corresponding to the row and the datum corresponding to the column of the data-to-cluster matrix 460. For example, element $C_{mn}$ may depend on the datum corresponding to row m and the datum corresponding to column n. In certain embodiments the cost may be a metric, as described above with reference to FIG. 2. The cost may be based, for example, on a distance. The distance may be, for example, the distance between the datum of dataset 200 corresponding to the row 510 and the datum of dataset 200 corresponding to the column 520. In some embodiments, the distance may depend on variables associated with data in dataset 200. In certain embodiments, the variables may have values associated with the datum of dataset 200 corresponding to row 510 and the datum of dataset 200 corresponding to column 520. As described above with reference to FIG. 2, the variables may be discrete or continuous-valued in certain aspects. In some embodiments, the distance may depend on both continuous and discrete valued data, for example the distance between a first datum associated with row 510 having a first value of a discrete variable and a first value of a continuous variable and a second datum associated with column 520 having a second value of the discrete variable and a second value of the continuous variable.

Figure 6A:
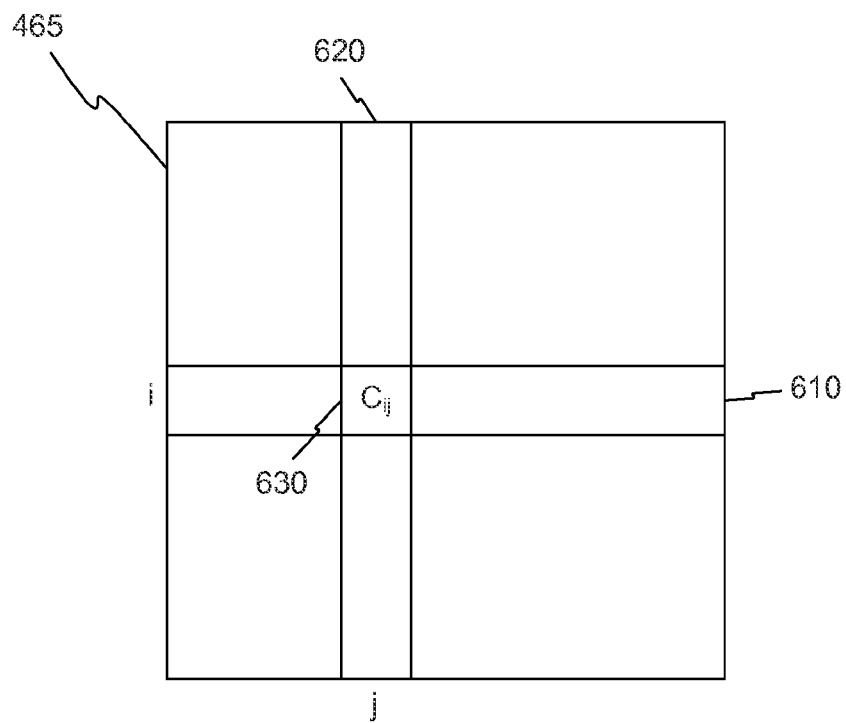
FIG. 6A depicts an exemplary data-to-dataset matrix.

FIG. 6A depicts an exemplary data-to-dataset matrix 465 consistent with disclosed embodiments. As described above with respect to FIG. 4, computing system 100 may be configured to store in memory 110 a data structure for performing an online update of a cluster. In some embodiments, computing system 100 may be configured to store data-to-dataset matrix 465. Data-to-dataset matrix 465 may include rows 610 corresponding to data in the cluster. The number of rows in the data-to-dataset matrix 465 may be a function of the number of data in the cluster. Data-to-dataset matrix 465 may include columns 620 corresponding to datum in dataset 200 in some embodiments. The number of columns in the data-to-dataset matrix 465 may be less than the number of data in dataset 200. Computing system 100 may be configured to randomly or deterministically sample the data in the cluster corresponding to the columns of the data-to-dataset matrix 465. Computing system 100 may be configured to use kernel methods to transform the columns of columns of the data-to-dataset matrix 465 into an inherently lower dimensional space in certain aspects. In various aspects, computing system 100 may be configured to cluster data using an approximate distance metric. For example, computing system 100 may be configured to use principal component analysis, or similar methods known to one of skill in the art, to transform these columns while maintaining a good approximation of the space.

Computing system 100 may be configured to deterministically select the data in the cluster corresponding to the rows 610 consistent with disclosed embodiments. In one embodiment, this determination may depend on a cost based on the datum and the medoid of the cluster. The cost may depend, for example, on a distance. In some aspects, the distance between the datum and the current medoid 420 of the cluster may determine the likely improvement in new total cost 445 over current total cost 430. The greater the distance, the greater the potential magnitude of any improvement but the lower the likelihood of any improvement. Setting data far from current medoid 420 of the cluster, such as datum 230, as new medoid 435 may occasionally significantly improve the total cost of the partition. Setting data near to current medoid 420 of the cluster, such as datum 220, as new medoid 435 may often slightly improve the total cost of the partition. In certain aspects, computing system 100 may be configured to select a first number of data in the cluster closest to current medoid 420 and a second number of data in the cluster furthest from current medoid 420. The first and second number of data may total approximately half of the data in the cluster. The first and second number of data may in some embodiments be a function of the total number of data in the cluster. The function may depend on the state of the method, such as the degree of convergence of the method. In certain aspects, the function may be a logarithmic function. Preferably, the first number of rows may be in the range $0.1*\log(n_k)$ to $10*\log(n_k)$ and the second number of rows may be in the range $0.1*\log(n_k)$ to $5*\log(n_k)$, where $n_k$ is the number of data in the cluster.

Consistent with the disclosed embodiments, the computer system may be configured to store a cost 630 in each element of the data-to-dataset matrix. In certain embodiments, costs 630 may depend on the datum corresponding to the row and the datum corresponding to the column of the data-to-cluster matrix 460. For example, element $C_{ij}$ may depend on the datum corresponding to row i and the datum corresponding to column j. In certain embodiments the cost may be a metric, as described above with reference to FIG. 2. The cost may be based, for example, on a distance. The distance may be, for example, the distance between the datum of dataset 200 corresponding to the row 610 and the datum of dataset 200 corresponding to the column 620. In certain embodiments, the distance may depend on variables associated with data in dataset 200. In at least one aspect, the variables may have values associated with the datum of dataset 200 corresponding to row 610 and the datum of dataset 200 corresponding to column 620. As described above with reference to FIG. 2, the variables may be discrete or continuous-valued. In some embodiments, the distance may depend on both continuous and discrete valued data such as, for example, the distance between a first datum associated with row 610 having a first value of a discrete variable and a first value of a continuous variable and a second datum associated with column 620 having a second value of the discrete variable and a second value of the continuous variable.

Figure 6B:
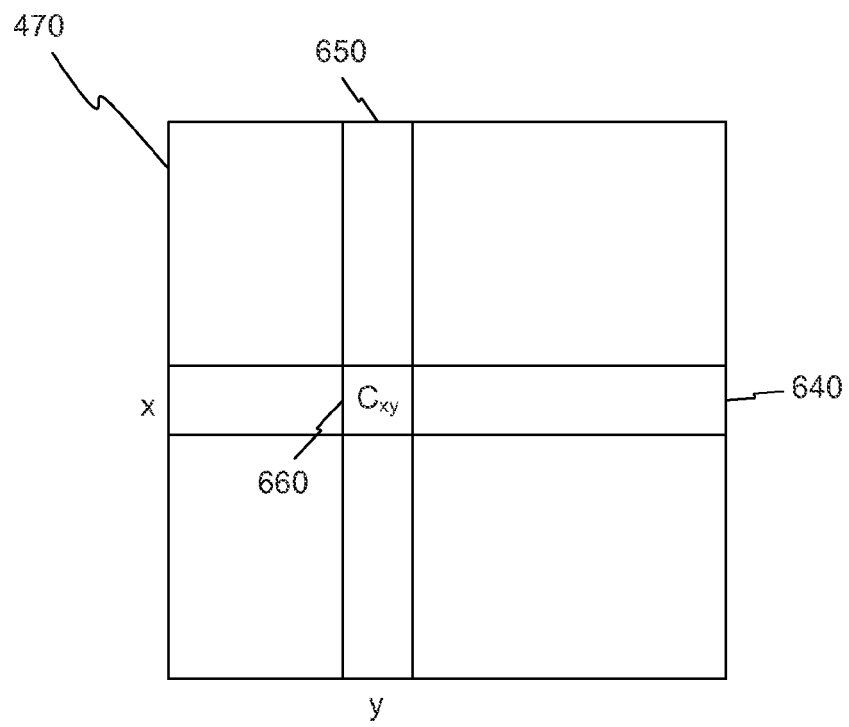
FIG. 6B depicts an exemplary cluster-to-dataset matrix.

FIG. 6B depicts an exemplary cluster-to-dataset matrix 470 consistent with disclosed embodiments. As described above with respect to FIG. 4, computing system 100 may be configured to store in memory 110 a data structure for performing an online update of a cluster. In some embodiments, computing system 100 may be configured to store cluster-to-dataset matrix 470. Cluster-to-dataset matrix 470 may include rows 640 corresponding to medoids of the clusters partitioning dataset 200. Cluster-to-dataset matrix 470 may include columns 650 corresponding to the data in dataset 200 in some embodiments. The number of columns in the cluster-to-dataset matrix 465 may be less than the number of data in dataset 200. Computing system 100 may be configured to randomly or deterministically sample the data in the cluster corresponding to the columns of the cluster-to-dataset matrix 470. Computing system 100 may be configured to use kernel methods to transform the columns of columns of the cluster-to-dataset matrix 470 into an inherently lower dimensional space in certain aspects. In various aspects, computing system 100 may be configured to cluster data using an approximate distance metric. For example, computing system 100 may be configured to use principal component analysis, or similar methods known to one of skill in the art, to transform these columns while maintaining a good approximation of the space.

Consistent with the disclosed embodiments, the computer system may be configured to store a cost 660 in each element of the cluster-to-dataset matrix. In some embodiments, cost 660 may depend on characteristics of the cluster of dataset 200 corresponding to the row of the cluster-to-dataset matrix, the datum corresponding to the column of the cluster-to-dataset, or characteristics of both the cluster and the datum. In some embodiments, cost 660 may be based on a distance. In certain embodiments, this distance may be between the medoid of the cluster corresponding to the row 640 and the datum of dataset 200 corresponding to column 650. For example, cost $C_{xy}$ may depend on the distance between the medoid of the cluster corresponding to row x and the datum in dataset 200 corresponding to column y. The distance may depend on variables associated with data in dataset 200. In some cases, the variables may have values associated with the datum of dataset 200 corresponding to row 640 and the datum of dataset 200 corresponding to column 650. As described above with reference to FIG. 2, the variables may be discrete or continuous-valued. In some embodiments, the distance may depend on both continuous and discrete valued data such as, for example, the distance between a first datum associated with row 640 having a first value of a discrete variable and a first value of a continuous variable and a second datum associated with column 650 having a second value of the discrete variable and a second value of the continuous variable.

Figure 7:
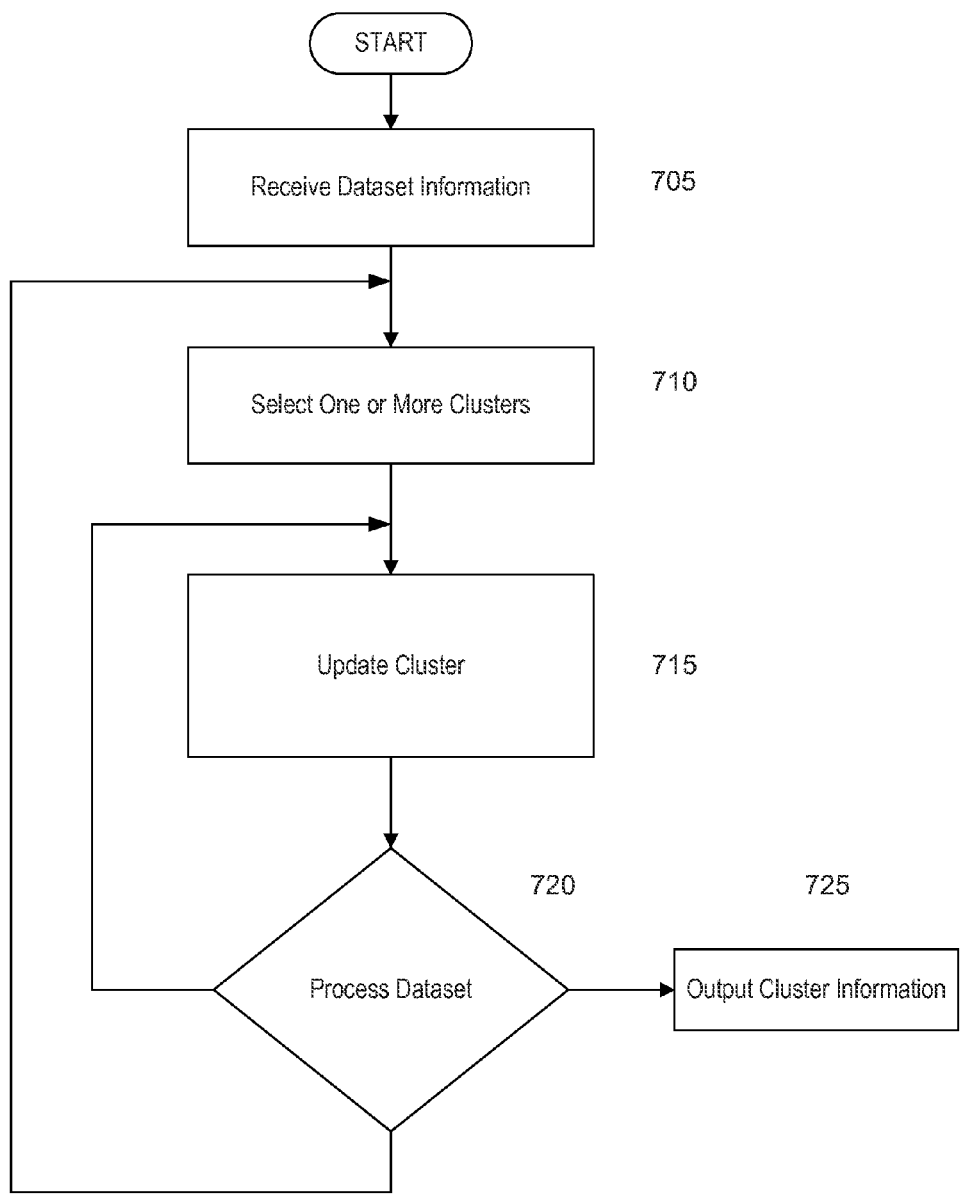
FIG. 7 depicts a flowchart of an exemplary method for partitioning a dataset.

FIG. 7 depicts a flowchart of an exemplary method of analyzing a dataset with a data-to-cluster matrix consistent with disclosed embodiments. The steps depicted in FIG. 7 may correspond to updating the partition (step 310) or performing an online update (step 320) as described with reference to FIG. 3. In some embodiments, the steps of FIG. 7 may be performed independently of the method disclosed in FIG. 3. Computing system 100 may be configured to receive dataset information in step 705. Computing system 100 may be configured to receive dataset information through for example I/O interface 120 or network adaptor 125. Computing system 100 may be configured to receive dataset information from a previous step in the disclosed embodiments. The dataset information may include, for example, dataset 200 or a partition associated with dataset 200. In some embodiments, dataset 200 may be derived from the dataset information received. As a non-limiting example, computing system 100 may be configured to create dataset 200 using processor 105 from one or more data structures received consistent with disclosed embodiments.

In certain exemplary embodiments, dataset 200 may be partitioned into clusters, each cluster associated with current medoid 420 and current cluster cost 425. The dataset information may include a stopping condition 450 in various aspects, as described with reference to FIG. 4. For example, computing system 100 may be configured to receive a value for stopping condition 450. In some embodiments, computing system 100 may be configured to maintain a counter in memory 110 for comparison to the value as a threshold. In other embodiments, computing system 100 may be configured to decrement the value and compare the decremented value to a predetermined value, such as zero. The dataset information may include a value for percent neighbors 455 in certain aspects, as described with reference to FIG. 4.

Computing system 100 may be configured to select for updating one or more of the clusters partitioning dataset 200 in step 710 consistent with disclosed embodiments. Computing system 100 may be configured to select all of the clusters partitioning dataset 200 for updating. Computing system 100 may be configured select clusters from the clusters partitioning dataset 200 deterministically in one embodiment. Computing system 100 may be configured to select clusters sequentially or based on a state of the disclosed embodiments. As a non-limiting example, computing system 100 may be configured to select clusters based on, for example, a characteristic of the clusters such as an absolute or relative value of a cost function, the rate of change of a value of a cost function, or the number of data in the cluster. Computing system 100 may be configured to select clusters based on a history of the analysis or a recency or frequency of previous updates. Computing system 100 may be configured to select clusters from the clusters partitioning dataset 200 randomly in another embodiment.

Computing system 100 may be configured to update selected clusters to determine new medoids in step 715 consistent with disclosed embodiments. Computing system 100 may be configured to update selected clusters in a deterministic order. For example, computing system 100 may be configured to update selected clusters according to a sequence. As a non-limiting example, the sequence may be based on a characteristic of the clusters such as an absolute or relative value of a cost function, the rate of change of a value of a cost function, or the number of data in the cluster. Computing system 100 may be configured to determine a new medoid 435, a new cluster cost 440, and/or a new total cost 445. In some embodiments, computing system 100 may be configured to update stopping condition 450.

Computing system 100 may be configured to process dataset 200 in step 720 consistent with disclosed embodiments. Processing dataset 200 may include one or more of evaluating whether another cluster remains to be updated, partitioning dataset 200 based on current medoids, or evaluating whether stopping condition 450 is satisfied. Computing system 100 may be configured to return to step 715 and update another cluster unless no selected cluster remains to be updated. Dataset 200 may be partitioned after each cluster is updated. Dataset 200 may be partitioned after multiple clusters are updated. In some embodiments, dataset 200 may be partitioned after all clusters in a selected subset of the clusters partitioning dataset 200 are updated. In some cases, dataset 200 may be partitioned after all clusters partitioning dataset 200 are updated. Computing system 100 may be configured to use processor 105 to evaluate stopping condition 450. For example, computing system 100 may be configured to compare the value of a counter to the value of a threshold. Computer system 100 may be configured to return to step 710 if the stopping condition is not satisfied.

Computer system 100 may be configured to output cluster information if the stopping condition is satisfied. Computer system 100 may be configured to perform the tasks of processing dataset 200 in any order. As a non-limiting example, computing system 100 may be configured to (1) evaluate whether another cluster remains to be updated, (2) if not, partition dataset 200 based on current medoids, (3) evaluate whether the stopping condition is satisfied, and (4) if so, output cluster information. As another non-limiting example, computing system 100 may be configured to (1) evaluate whether the stopping condition is satisfied, (2) if so, partition dataset 200 based on current medoids and output cluster information, or (3) if not, evaluate whether another cluster remains to be updated, and (4) if not, partition dataset 200 based on current medoids.

Computing system 100 may be configured to output cluster information in step 725 consistent with disclosed embodiments. In some embodiments, the data stored in memory 110 as described above with reference to FIG. 4 may be output. The data may be output through I/O interface 120 in certain aspects. The data may be output through network adaptor 125 in various aspects. The data may be output on display 115 in certain aspects. The data may be used as input to a program running on a computing system, such as computing system 100. The data may be written to a memory, including without limitation a hard drive, disk drive, removable solid state memory, or other memory known to one of skill in the art. In some embodiments, one or more of the cluster assignments of each row of dataset 200, the membership of each cluster, the medoids for the clusters, the total cost of the partition, the cost of each cluster, the value for each datum according to a metric, references to the medoids in dataset 200, or a data structure containing information about the evaluation process may be output. The output cluster information may be used to determine a structure in dataset 200. For example, a user may use the display to identify commonalities between data in the same cluster. As an additional example, an automated screening mechanism may receive the cluster information and perform automated testing based on the data in the clusters.

Figure 8:
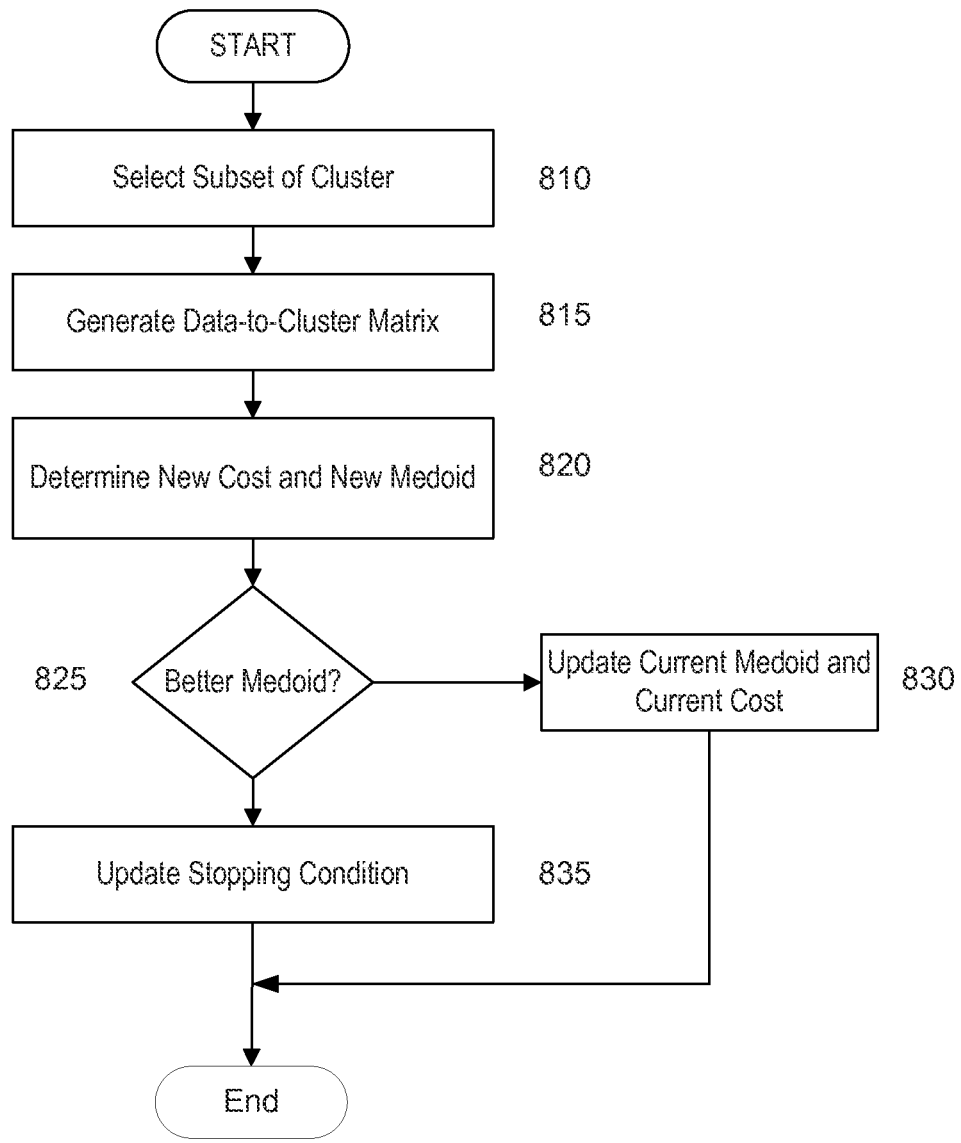
FIG. 8 depicts a flowchart of an exemplary method for updating a cluster.

FIG. 8 depicts a flowchart of an exemplary method of updating a cluster consistent with disclosed embodiments. In a first embodiment, the steps depicted in FIG. 8 may correspond to step 715 as described with reference to FIG. 7. In a second embodiment, the steps depicted in FIG. 8 could be performed independently to improve the clustering of dataset 200. The steps depicted in FIG. 8 may be performed on all clusters partitioning dataset 200. In some embodiments, the steps depicted in FIG. 8 may be performed on a subset of the clusters in dataset 200. Computing system 100 may be configured to select a subset 415 of one of one or more clusters 410 in step 810 in certain aspects. As described above, with reference to FIG. 5, subset 415 may be generated by random sampling of data in the cluster. In some aspects, computing system 100 may be configured to select a number of data based on the value of percent neighbor 455 stored in memory 110.

Computing system 100 may be configured to generate a data-to-cluster matrix 460 in step 815 consistent with disclosed embodiments. As described above with reference to FIG. 5, data-to-cluster matrix 460 may have rows 510 and columns 520 corresponding to data in the cluster. The value of element 530 of data-to-cluster matrix 460 may depend on the values of one or more variables associated with the data corresponding to row 510 and column 520 in various aspects.

Computing system 100 may be configured to determine new medoid 435 and new cluster cost 420 in step 820 consistent with disclosed embodiments. Computing system 100 may be configured to determine a row cost for each row 510 of data-to-cluster matrix 460. This row cost may depend on the value of the elements 530 of the row 510 in certain aspects. Computing system 100 may be configured to determine a minimum row cost for data-to-cluster matrix 460. Computing system 100 may be configured to assign as new cluster cost 440 the minimum row cost and to assign as new medoid 435 the datum of the cluster corresponding to the row of the data-to-cluster matrix 460 with the minimum row cost.

Computing system 100 may be configured to determine whether new medoid 435 is better than current medoid 420 in step 825 consistent with disclosed embodiments. Computing system 100 may be configured to base this determination on new cluster cost 440 in some embodiments. In certain aspects, computing system 100 may be configured to compare new cluster cost 440 to current cluster cost 425 to determine the lower cluster cost. In some aspects, if the new cluster cost 440 is lower, then in step 830, computing system 100 may be configured to update current medoid 420 with new medoid 435 and current cluster cost 425 with new cluster cost 440. In certain embodiments, if new cluster cost 440 is not lower, computer system 100 may be configured to update stopping condition 450 in step 835. Computer system 100 may be configured to increment a counter, decrement a value, use processor 105 to apply a logical test stored in memory 110, or otherwise track unsuccessful attempts to update clusters in some embodiments. As described above with reference to FIG. 3, computer system 200 may be configured to output cluster information upon satisfaction of stopping condition 450.

Figure 9:
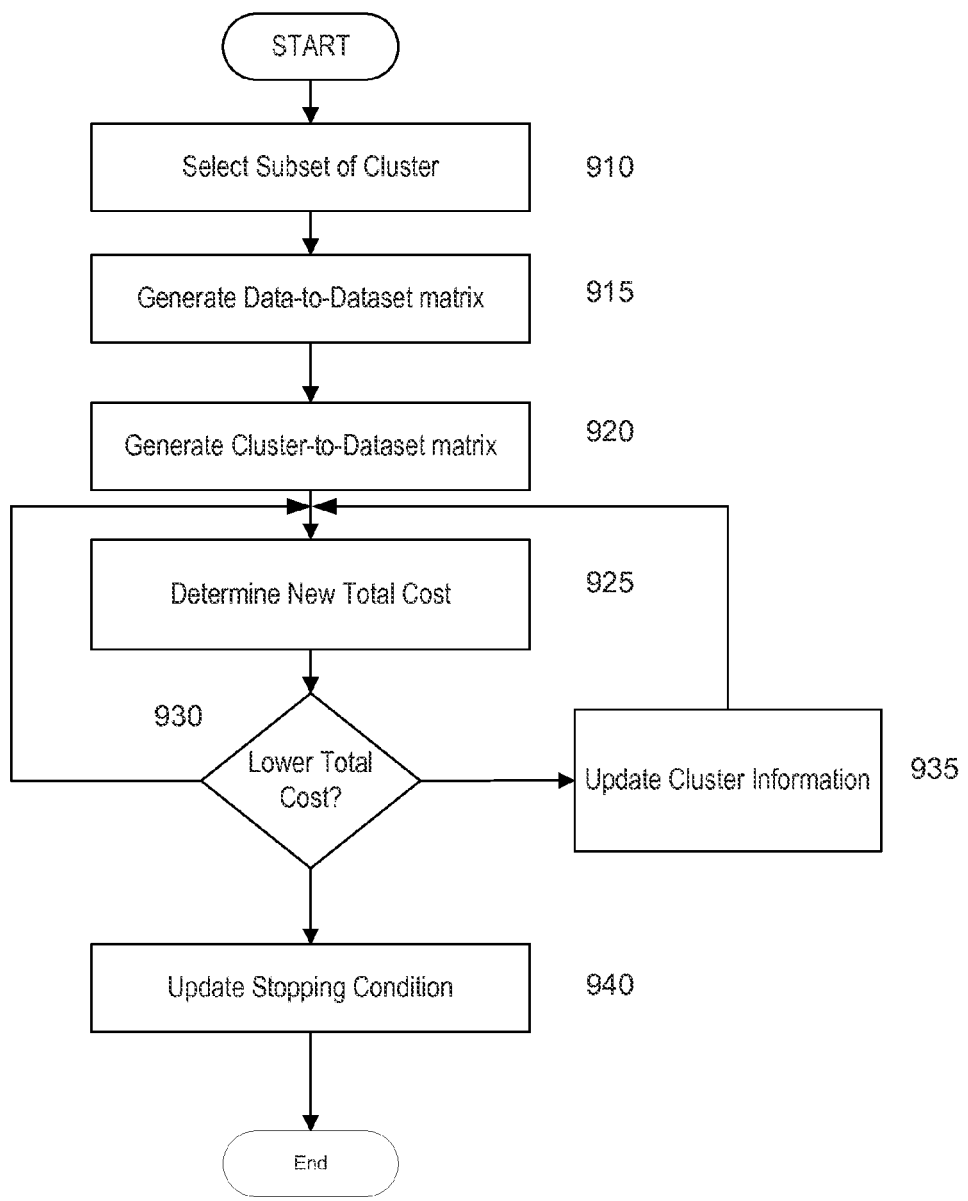
FIG. 9 depicts a flowchart of an exemplary method for performing an online update.

FIG. 9 depicts a flowchart of an exemplary method of performing an online update of a cluster consistent with disclosed embodiments. In a first embodiment, the steps depicted in FIG. 9 may correspond to step 715 as described with reference to FIG. 7. In a second embodiment, the steps depicted in FIG. 9 could be performed independently to improve the clustering of dataset 200. The steps depicted in FIG. 9 may be performed on all clusters partitioning dataset 200. The steps depicted in FIG. 9 may also be performed on a subset of the clusters in dataset. Computing system 100 may be configured to select a subset 415 of one of one or more clusters 410 in step 910 in certain aspects. As described above, with reference to FIG. 6A, subset 415 may be generated by deterministic sampling of data in the cluster.

Computer system 100 may be configured to generate data-to-dataset matrix 465 in step 915 consistent with disclosed embodiments. As described above with reference to FIG. 6A, data-to-dataset matrix 465 may include rows 610 corresponding to data in the cluster and columns 620 corresponding to data in dataset 200 in an embodiment. The value of element 630 of data-to-dataset matrix 465 may depend on the data corresponding to row 610 and column 620 according to a metric. The metric may depend on the values of one or more variables associated with the data corresponding to the row 610 and the column 620 of the element 630 in certain aspects. One of the variables may be a continuous variable. One of the variables may be a discrete variable. In some cases, one of the variables may be a discrete variable and one of the variables may be a continuous variable.

Computing system 100 may be configured to create a cluster-to-dataset matrix 470 in step 920 consistent with disclosed embodiments. As described above with reference to FIG. 6B, cluster-to-dataset matrix 470 may include rows 640 corresponding to the medoids of the clusters partitioning dataset 200 and columns 650 corresponding to data in dataset 200 in an embodiment. In some cases, the value of element 660 of cluster-to-dataset matrix 470 may depend on the data corresponding to row 640 and column 650 according to a metric. The metric may depend on the values of one or more variables associated with the data corresponding to the row 640 and the column 650 of the element 660 in certain aspects. One of the variables may be a continuous variable. One of the variables may be a discrete variable. In some cases, one of the variables may be a discrete variable and one of the variables may be a continuous variable.

Computing system 100 may be configured to determine a new total cost 455 corresponding to a row of data-to-dataset matrix 465 in step 925 consistent with disclosed embodiments. New total cost 445 may be a function of replacement costs for each datum of dataset 200 in an embodiment. New total cost 445 may be the sum of replacement costs for the data in dataset 200 in various aspects. The replacement cost for a datum in dataset 200 may be based on the cost of an element in row 610 of data-to-dataset matrix 465. The replacement cost for a datum in dataset 200 may be based on a subset of the costs for the element in column 650 of cluster-to-dataset matrix 470. The subset of costs may include the costs for the element in column 650, excluding the cost for the current cluster in various aspects. As a non-limiting example, the replacement cost for a datum in dataset 200 may be the minimum of the costs in the subset of costs described above and the cost of element 630 in data-to-dataset matrix 465, where element 630 has row 610 corresponding to the current cluster and column 620 corresponding to the datum in dataset 200. As a non-limiting example, when dataset 200 is clustered into four clusters, the second cluster is the current cluster, the value of the $10^{th}$ column of cluster-to-dataset matrix 470 is [3 4 10 7], and the value of the element of data-to-dataset matrix 465 at the second row and tenth column is [2], then the subset of costs is [3 10 7] and the replacement cost is the minimum of [2] and [3 10 7]. Thus, in this example, the replacement value for a datum corresponding to the $10^{th}$ column of cluster-to-dataset matrix 470 is 2.

Computing system 100 may be configured to compare new total cost 445 to current total cost 430 in step 930 consistent with disclosed embodiments. Computing system 100 may be configured to update cluster information in step 935 if current total cost 430 is greater than new total cost 445. Computing system 100 may be configured to return to step 925 and determine a new total cost corresponding to another row of data-to-cluster matrix 460 in some embodiments. Computing system 100 may be configured to update stopping condition 450 in step 940 if new total costs 445 have been evaluated for all rows of data-to-dataset matrix 460 in certain aspects.

Computing system 100 may be configured to update cluster information 450 in step 935 consistent with disclosed embodiments. In certain embodiments, computing system 100 may be configured to set the current medoid 420 to the datum corresponding to the row of data-to-dataset matrix 460. Computing system 100 may, for example, be configured to set the current total cost 430 to the new total cost 445.

Computing system 100 may be configured to update stopping condition 450 in step 940 consistent with disclosed embodiments. In some embodiments, stopping condition 450 may be updated if one or more new total costs 445 corresponding to rows of data-to-dataset matrix 465 are greater than current total cost 430. In some embodiments, stopping condition 450 may be updated if all new total costs 445 corresponding to rows of data-to-dataset matrix 465 are greater than current total cost 430. In certain embodiments, stopping condition 450 may include a threshold or counter for performing the online update distinct from the threshold or counter for updating the clusters. In other embodiments, the same threshold or counter may be used for both performing the online update and updating the partition. Computer system 100 may be configured to increment a counter, decrement a value, use processor 105 to apply a logical test stored in memory 110, or otherwise track unsuccessful attempts to perform the online update in some embodiments.

The foregoing description of the inventions, along with their associated embodiments, has been presented for purposes of illustration only. It is not exhaustive and does not limit the inventions to the precise form disclosed. Those skilled in the art will appreciate from the foregoing description that modifications and variations are possible in light of the above teachings or may be acquired from practicing the inventions. As described herein, the terms "row" and "column" are not intended to limit the disclosed embodiments to any particular matrix orientation, as would be recognized by one of skill in the art. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments. Accordingly, the inventions are not limited to the above-described embodiments, but instead are defined by the appended claims in light of their full scope of equivalents.

What is claimed is:

1. A computer-implemented method, comprising:
    iteratively updating clusters, a dataset partitioned into the clusters, using subsets of data from the clusters, an iteration comprising:
        selecting a cluster from the clusters, the selected cluster (i) comprising a first subset of the dataset, and (ii) associated with a current medoid of the cluster and a current cost of the cluster;
        determining a new cost of the selected cluster and a new medoid of the selected cluster using a matrix wherein (i) a second subset of the cluster is associated with either rows or columns of the matrix, (ii) a third subset of the dataset is associated with columns of the matrix, when the second subset is associated with rows of the matrix, or rows of the matrix, when the second subset is associated with columns of the matrix, and (iii) a cost for an element of the matrix is based on a distance between a datum of the second subset and a datum of the third subset;
        replacing the current medoid of the selected cluster with the new medoid of the selected cluster when the new cost of the selected cluster is less than the current cost of the selected cluster; and
        outputting cluster information to indicate a structure of the dataset.

2. The computer-implemented method of claim 1, wherein the second subset is randomly selected.

3. The computer-implemented method of claim 1, wherein the datum of the second subset is associated with a first value of a discrete variable and the datum of the third subset is associated with a second value of the discrete variable and the distance is a function of the first and second values of the discrete variable.

4. The computer-implemented method of claim 3, wherein the datum of the second subset is also associated with a first value of a continuous variable and the datum of the third subset is also associated with a second value of the continuous variable and the distance is also a function of the first and second values of the continuous variable.

5. The computer-implemented method of claim 1, wherein the distance is calculated using an arbitrary distance metric.

6. The computer-implemented method of claim 1, further comprising initially partitioning the dataset into the clusters based on initial medoids.

7. The computer-implemented method of claim 6, wherein the initial medoids are automatically calculated based on a sample of the dataset.

8. The computer-implemented method of claim 6, wherein the initial medoids are randomly selected from the dataset.

9. The computer-implemented method of claim 6, wherein the initial medoids are received from a user.

10. A computer-implemented method, comprising:
iteratively updating clusters, a dataset partitioned into the clusters, using subsets of data from the clusters, an iteration comprising:
selecting a cluster from the clusters, the selected cluster (i) comprising a first subset of the dataset, and (ii) associated with a current medoid of the cluster;
determining a new total cost of the clusters using a first matrix wherein (i) a second subset of the selected cluster is associated with either rows or columns of the first matrix, (ii) the dataset is associated with columns of the first matrix, when the second subset is associated with rows of the first matrix, or rows of the first matrix, when the second subset is associated with columns of the first matrix, and (iii) a cost for an element of the first matrix is based on a distance between a datum of the second subset and a datum of the dataset;
replacing the current medoid of the selected cluster with a new medoid of the selected cluster when the new total cost of the clusters is less than a current total cost of the clusters; and
outputting cluster information to indicate a structure of the dataset.

11. The computer-implemented method of claim 10, wherein the second subset comprises:
a first number of data closest to a first medoid, and
a second number of data furthest from the first medoid.

12. The computer-implemented method of claim 11, wherein the first number and second number are logarithmic functions of a total number of data in the selected cluster.

13. The computer-implemented method of claim 12, wherein $n_k$ is the total number of data in the selected cluster, the first number is between $0.1*\log 10(n_k)$ and $10*\log 10(n_k)$, and the second number is between $0.1*\log 10(n_k)$ and $5*\log 10(n_k)$.

14. The computer-implemented method of claim 10, wherein determining the new total cost of the clusters further comprises:
generating a second matrix, wherein (i) at least some of the clusters are associated with either rows or columns of the second matrix, (ii) the dataset is associated with columns of the second matrix, when the least some of the clusters are associated with rows of the second matrix, or rows of the second matrix, when the at least some of the clusters are associated with columns of the second matrix, and (iii) costs for elements of the second matrix are based on distances between medoids of the at least some of the clusters and data in the dataset;
generating a third matrix comprising the second matrix and a row of the first matrix, when the second subset is associated with rows of the first matrix and the at least some of the clusters are associated with rows of the second matrix, or a column of the first matrix, when the second subset is associated with columns of the first matrix and the at least some of the clusters are associated with columns of the second matrix; and
wherein the new total cost of the clusters is a sum over rows of minimum values for each column of the third matrix, when the at least some of the clusters are associated with rows of the second matrix, or a sum over columns of minimum values for each row of the third matrix, when the at least some of the clusters are associated with columns of the second matrix.

15. The method of claim 14, wherein the second matrix does not include a row, when the at least some of the clusters are associated with rows of the second matrix, or a column, when the at least some of the clusters are associated with columns of the second matrix, associated with the selected cluster.

16. The method of claim 10, wherein for each element of the first matrix,
the datum of the second subset is associated with a first value of a discrete variable;
the datum of the dataset is associated with a second value of the discrete variable; and
the distance is a function of the first value and the second value of the discrete variable.

17. The method of claim 16, wherein
the datum of the second subset is also associated with a first value of a continuous variable;
the datum of the dataset is also associated with a second value of the continuous variable; and
the distance is also a function of the first value and the second value of the continuous variable.

18. A computer-implemented method, comprising:
iteratively updating clusters, a dataset partitioned into the clusters, using subsets of data from the clusters, an iteration comprising:
selecting a first cluster from the clusters, the first cluster (i) comprising a subset of the dataset and (ii) associated with a current medoid of the first cluster and a current cost of the first cluster;
determining a new medoid of the first cluster and a new cost of the first cluster based on a first matrix, wherein (i) a subset of the first cluster is associated with either rows or columns of the first matrix, (ii) data in the dataset is associated with columns, when the subset is associated with rows of the first matrix, or rows of the first matrix, when the subset is associated with columns of the first matrix;
replacing the current medoid of the first cluster with the new medoid of the first cluster when the new cost of the first cluster is less than the current cost of the first cluster; and
outputting cluster information to indicate a structure of the dataset.

19. The computer-implemented method of claim 18, wherein the subset of the first cluster is randomly selected.

20. The computer-implemented method of claim 19, wherein the subset of the first cluster comprises a first number of data closest to the current medoid of the first cluster and a second number of data furthest from the current medoid of the first cluster, wherein the first number of data and second number of data are logarithmic functions of a total number of data in the first cluster.

21. A computer-implemented system, comprising:
one or more processors configured to perform the steps of:
iteratively updating clusters, a dataset partitioned into the clusters, using subsets of data from the clusters, an iteration comprising:
selecting a cluster from the clusters, the selected cluster (i) comprising a first subset of the dataset, and (ii) associated with a current medoid of the cluster and a current cost of the cluster;
determining a new cost of the selected cluster and a new medoid of the selected cluster using a matrix wherein (i) a second subset of the cluster is associated with either rows or columns of the matrix, (ii) a third subset of the dataset is associated with columns of the matrix, when the second subset is associated with rows of the matrix, or rows of the matrix, when the second subset is associated with columns of the matrix, and (iii) a cost for an element of the matrix is based on a distance between a datum of the second subset and a datum of the third subset;
replacing the current medoid of the selected cluster with the new medoid of the selected cluster when the new cost of the selected cluster is less than the current cost of the selected cluster; and
outputting cluster information to indicate a structure of the dataset.

22. The computer-implemented system of claim 21, wherein the datum of the second subset is associated with a first value of a discrete variable and the datum of the third subset is associated with a second value of the discrete variable and the distance is a function of the first and second values of the discrete variable.

23. The computer-implemented system of claim 22, wherein the datum of the second subset is also associated with a first value of a continuous variable and the datum of the third subset is also associated with a second value of the continuous variable and the distance is also a function of the first and second values of the continuous variable.

24. A non-transitory computer-readable medium containing instructions that, when executed by one or more processors, cause a device to perform operations, comprising:
iteratively updating clusters, a dataset partitioned into the clusters, using subsets of data from the clusters, an iteration comprising:
selecting a cluster from the clusters, the selected cluster (i) comprising a first subset of the dataset, and (ii) associated with a current medoid of the cluster and a current cost of the cluster;
determining a new cost of the selected cluster and a new medoid of the selected cluster using a matrix wherein (i) a second subset of the cluster is associated with either rows or columns of the matrix, (ii) a third subset of the dataset is associated with columns of the matrix, when the second subset is associated with rows of the matrix, or rows of the matrix, when the second subset is associated with columns of the matrix, and (iii) a cost for an element of the matrix is based on a distance between a datum of the second subset and a datum of the third subset;
replacing the current medoid of the selected cluster with the new medoid of the selected cluster when the new cost of the selected cluster is less than the current cost of the selected cluster; and
outputting cluster information to indicate a structure of the dataset.

25. The non-transitory computer-readable medium of claim 24, wherein the datum of the second subset is associated with a first value of a discrete variable and the datum of the third subset is associated with a second value of the discrete variable and the distance is a function of the first and second values of the discrete variable.

26. The non-transitory computer-readable medium of claim 25, wherein the datum of the second subset is also associated with a first value of a continuous variable and the datum of the third subset is also associated with a second value of the continuous variable and the distance is also a function of the first and second values of the continuous variable.

27. A computer-implemented system, comprising:
one or more processors configured to perform the steps of:
iteratively updating clusters, a dataset partitioned into the clusters, using subsets of data from the clusters, an iteration comprising:
selecting a cluster from the clusters, the selected cluster (i) comprising a first subset of the dataset, and (ii) associated with a current medoid of the cluster;
determining a new total cost of the clusters using a first matrix wherein (i) a second subset of the selected cluster is associated with either rows or columns of the first matrix, (ii) the dataset is associated with columns of the first matrix, when the second subset is associated with rows of the first matrix, or rows of the first matrix, when the second subset is associated with columns of the first matrix, and (iii) a cost for an element of the first matrix is based on a distance between a datum of the second subset and a datum of the dataset;
replacing the current medoid of the selected cluster with a new medoid of the selected cluster when the new total cost of the clusters is less than a current total cost of the clusters; and
outputting cluster information to indicate a structure of the dataset.

28. The computer-implemented system of claim 27, wherein the second subset comprises: a first number of data closest to a first medoid, and a second number of data furthest from the first medoid;
wherein the first number and second number are logarithmic functions of a total number of data in the selected cluster; and
wherein $n_k$ is the total number of data in the selected cluster, the first number is between $0.1*\log 10(n_k)$ and $10*\log 10(n_k)$, and the second number is between $0.1*\log 10(n_k)$ and $5*\log 10(n_k)$.

29. The computer-implemented system of claim 27, wherein determining the new total cost of the clusters further comprises:
generating a second matrix, wherein (i) at least some of the clusters are associated with either rows or columns of the second matrix, (ii) the dataset is associated with columns of the second matrix, when the least some of the clusters are associated with rows of the second matrix, or rows of the second matrix, when the at least some of the clusters are associated with columns of the second matrix, and (iii) costs for elements of the second matrix are based on distances between medoids of the at least some of the clusters and data in the dataset;

generating a third matrix comprising the second matrix and a row of the first matrix, when the second subset is associated with rows of the first matrix and the at least some of the clusters are associated with rows of the second matrix, or a column of the first matrix, when the second subset is associated with columns of the first matrix and the at least some of the clusters are associated with columns of the second matrix; and wherein the new total cost of the clusters is a sum over rows of minimum values for each column of the third matrix, when the at least some of the clusters are associated with rows of the second matrix, or a sum over columns of minimum values for each row of the third matrix, when the at least some of the clusters are associated with columns of the second matrix.

30. A non-transitory computer-readable medium containing instructions that, when executed by one or more processors, cause a device to perform operations, comprising:
iteratively updating clusters, a dataset partitioned into the clusters, using subsets of data from the clusters, an iteration comprising:
selecting a cluster from the clusters, the selected cluster (i) comprising a first subset of the dataset, and (ii) associated with a current medoid of the cluster;
determining a new total cost of the clusters using a first matrix wherein (i) a second subset of the selected cluster is associated with either rows or columns of the first matrix, (ii) the dataset is associated with columns of the first matrix, when the second subset is associated with rows of the first matrix, or rows of the first matrix, when the second subset is associated with columns of the first matrix, and (iii) a cost for an element of the first matrix is based on a distance between a datum of the second subset and a datum of the dataset;
replacing the current medoid of the selected cluster with a new medoid of the selected cluster when the new total cost of the clusters is less than a current total cost of the clusters; and
outputting cluster information to indicate a structure of the dataset.

31. The non-transitory computer-readable medium of claim 30,
wherein the second subset comprises: a first number of data closest to a first medoid, and a second number of data furthest from the first medoid;
wherein the first number and second number are logarithmic functions of a total number of data in the selected cluster; and
wherein $n_k$ is the total number of data in the selected cluster, the first number is between $0.1*\log 10(n_k)$ and $10*\log 10(n_k)$, and the second number is between $0.1*\log 10(n_k)$ and $5*\log 10(n_k)$.

32. The non-transitory computer-readable medium of claim 30,
wherein determining the new total cost of the clusters further comprises:
generating a second matrix, wherein (i) at least some of the clusters are associated with either rows or columns of the second matrix, (ii) the dataset is associated with columns of the second matrix, when the least some of the clusters are associated with rows of the second matrix, or rows of the second matrix, when the at least some of the clusters are associated with columns of the second matrix, and (iii) costs for elements of the second matrix are based on distances between medoids of the at least some of the clusters and data in the dataset;
generating a third matrix comprising the second matrix and a row of the first matrix, when the second subset is associated with rows of the first matrix and the at least some of the clusters are associated with rows of the second matrix, or a column of the first matrix, when the second subset is associated with columns of the first matrix and the at least some of the clusters are associated with columns of the second matrix; and wherein the new total cost of the clusters is a sum over rows of minimum values for each column of the third matrix, when the at least some of the clusters are associated with rows of the second matrix, or a sum over columns of minimum values for each row of the third matrix, when the at least some of the clusters are associated with columns of the second matrix.

33. A computer-implemented system, comprising:
one or more processors configured to perform the steps of:
iteratively updating clusters, a dataset partitioned into the clusters, using subsets of data from the clusters, an iteration comprising:
selecting a first cluster from the clusters, the first cluster (i) comprising a subset of the dataset and (ii) associated with a current medoid of the first cluster and a current cost of the first cluster;
determining a new medoid of the first cluster and a new cost of the first cluster based on a first matrix, wherein (i) a subset of the first cluster is associated with either rows or columns of the first matrix, (ii) data in the dataset is associated with columns, when the subset is associated with rows of the first matrix, or rows of the first matrix, when the subset is associated with columns of the first matrix;
replacing the current medoid of the first cluster with the new medoid of the first cluster when the new cost of the first cluster is less than the current cost of the first cluster; and
outputting cluster information to indicate a structure of the dataset.

34. A non-transitory computer-readable medium containing instructions that, when executed by one or more processors, cause a device to perform operations, comprising:
iteratively updating clusters, a dataset partitioned into the clusters, using subsets of data from the clusters, an iteration comprising:
selecting a first cluster from the clusters, the first cluster (i) comprising a subset of the dataset and (ii) associated with a current medoid of the first cluster and a current cost of the first cluster;
determining a new medoid of the first cluster and a new cost of the first cluster based on a first matrix, wherein (i) a subset of the first cluster is associated with either rows or columns of the first matrix, (ii) data in the dataset is associated with columns, when the subset is associated with rows of the first matrix, or rows of the first matrix, when the subset is associated with columns of the first matrix;

replacing the current medoid of the first cluster with the new medoid of the first cluster when the new cost of the first cluster is less than the current cost of the first cluster; and outputting cluster information to indicate a structure of the dataset.

\* \* \* \* \*

UNITED STATES PATENT AND TRADEMARK OFFICE
CERTIFICATE OF CORRECTION

PATENT NO.        : 10,445,341 B2
APPLICATION NO.   : 14/300123
DATED             : October 15, 2019
INVENTOR(S)       : Andrew Matteson Page 1 of 1

It is certified that error appears in the above-identified patent and that said Letters Patent is hereby corrected as shown below:

In the Specification

Column 6, Line 39, "may be configured to reparation" should read --may be configured to repartition--.

Column 16, Line 30, "other parts not describe" should read --other parts not described--.

Signed and Sealed this
Eleventh Day of February, 2020

Andrei Iancu
*Director of the United States Patent and Trademark Office*